E. A. ASHCROFT.
PRODUCTION OF CYANAMIDS AND CYANIDS OF THE ALKALI METALS.
APPLICATION FILED APR. 15, 1911.
1,041,566. Patented Oct. 15, 1912.
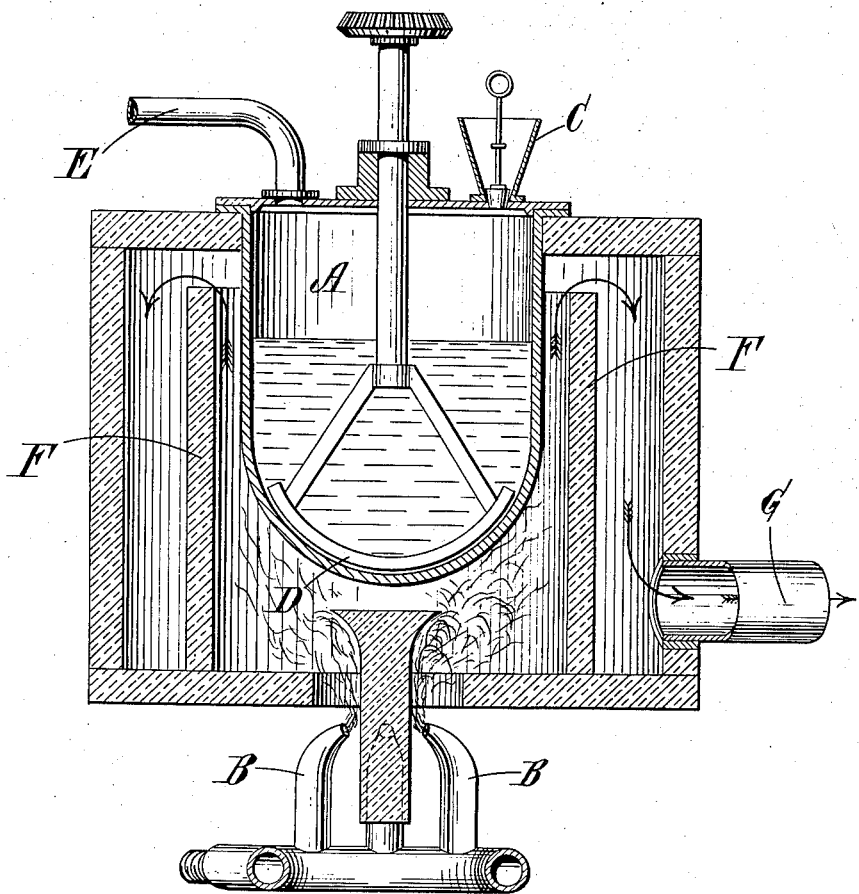

UNITED STATES PATENT OFFICE.

EDGAR ARTHUR ASHCROFT, OF LONDON, ENGLAND.

PRODUCTION OF CYANAMIDS AND CYANIDS OF THE ALKALI METALS.

1,041,566. Specification of Letters Patent. Patented Oct. 15, 1912.

Application filed April 15, 1911. Serial No. 621,391.

*To all whom it may concern:*

Be it known that I, EDGAR ARTHUR ASHCROFT, subject of the King of England, residing in London, England, have invented certain new and useful Improvements in the Production of Cyanamids and Cyanids of the Alkali Metals, of which the following is a specification.

The object of this invention is the economical production of cyanamids and cyanids of the alkali metals.

It is well known that cyanamids and cyanids are produced by reacting amids of the alkali metals (more particularly sodium or potassium) with carbon at suitable temperatures, the hydrogen escaping and the nitrogen of the amids remaining in combination as cyanamid or cyanid according to the temperature and the amount of carbon employed.

According to this invention cyanamid or cyanid of an alkali metal is produced by reacting the alkali amid with dicyandiamid or tricyantriamid.

According to a modified process cyanamid or cyanid of an alkali metal is produced by reacting the alkali amid with dicyandiamid or tricyantriamid and the ammonia produced during the reaction is utilized for the production of the alkali amid.

According to a further modification of this invention a process for the production of cyanamids and cyanids of the alkali metals consists in fusing the alkali metals with dicyandiamid or tricyantriamid, or other forms of cyanamid.

In carrying the first part of this process into effect the following reaction is utilized viz:—

(1) $(CN_2H_2)_2 + 4NaNH_2 = 2Na_2N_2C + 4NH_3$

Similar reactions occur with tricyantriamid (or with other forms of cyanamid) thereby producing alkali cyanamid and ammonia the latter being used again in the production of more amid. The above reaction is best carried out at about 350° C., but a higher temperature is required toward the end of the reaction to fuse the product completely.

When alkali cyanid is the desired end product the alkali cyanamid may be reacted with more carbon according to the well-known reaction $$Na_2N_2C + C = 2NaCN$$

or the reactions may be combined thus and the temperature raised during the reaction to about 750–850° C.

(2) $(CN_2H_2)_2 + 2C + 4NaNH_2 = 4NaCN + 4NH_3$

In carrying out the above process the dicyandiamid or tricyantriamid are conveniently and economically obtained by the known reaction of hot water on calcium cyanamid thus:—

(3) $2CaCN_2 + 4H_2O = 2Ca(OH)_2 + (CN_2H_2)_2$

The calcium cyanamid as is well known is produced economically from atmospheric nitrogen and calcium carbid by the Frank and Caro process and is an article of commerce in a large way today.

In carrying the second part of this invention into effect the following reaction is utilized viz:—

(4) $2Na + CN_2H_2 = Na_2CN_2 + H_2$ thereby producing cyanamid of the metal and hydrogen which escapes. Sodium cyanamid may be afterward converted to cyanid as described by the well known reaction with carbon.

The preferred method of carrying this invention into effect will now be described with reference to the accompanying drawings, but it is to be understood that the sequence of operations may be modified.

The sodium amid is first melted in a kettle A at a temperature which may begin at 150° C. The kettle is heated by the gas burners B. The dicyandiamid in dried crystallized form is slowly added to the melt by means of the hopper C and is stirred gently by the stirrer D. During the period of reaction, which may extend for some hours, the temperature is slowly raised until at the end of the treatment it reaches a point at which the cyanamid product is fully fused viz:— about 600° C. If preferred the dicyandiamid, which is freely fusible at a very low temperature, may be first melted in a closed vessel and poured slowly into the melted amid with gentle stirring. During the whole period of reaction the ammonia escapes from the vessel A by the conduit E and is collected.

As an example 78 kgs. of sodium amid is fused in the apparatus illustrated in the figure and 42 kgs. of dicyandiamid are added during two to four hours during which reaction takes place. 34 kgs. of ammonia escape and are collected. The product remaining is the cyanamid of sodium. The further treatment with 12 kgs. of carbon for the production of cyanid may be carried out in the same vessel or in another, after the previous reactions are completed, the temperature being suitably raised.

In carrying into effect the second part of this invention the alkali metal would be melted in the kettle A and the dicyandiamid would be slowly added to the melt by means of the hopper C the mass being stirred gently by the stirrer D and heated until it forms a completely fused mass. The alkali metal reacts with the dicyandiamid to form cyanamid of the metal and hydrogen which escapes. Should cyanid of the metal be the required product carbon is mixed with the cyanamid in the kettle and the whole heated so that the carbon reacts with the cyanamid to form cyanid of the metal.

The herein described process, in conjunction with the manufacture of alkali amids from ammonia and alkali metals, or preferably by the direct process from sodium chlorid and ammonia, constitutes an advantageous method for the manufacture of cyanamids or cyanids of the alkali metals. The ammonia in this combined process merely circulates and is not consumed, the nitrogen of the cyanid being supplied from atmospheric nitrogen.

Although the process for the production of cyanamid or cyanid of an alkali metal has been described as one in which the amid of the alkali metal or the alkali metal itself is reacted with dicyandiamid or tricyantriamid (the polymerized forms of pure cyanamid) these being the most stable practical forms of cyanamid, it will be evident that the unpolymerized form known to chemists as cyanamid ($H_2N-CN$) can be employed when it can be obtained in stable form without departing from the invention as well as still higher polymerized forms.

What I claim as my invention and desire to secure by Letters Patent is:—

1. The herein described improvement in the process of producing cyanamid of an alkali metal which consists in reacting upon the amid of said metal with a form of cyanamid.

2. The herein described improvement in the process of producing cyanamid of an alkali metal which consists in reacting upon the amid of said metal with a form of cyanamid and utilizing the ammonia liberated by that reaction in the production of an additional quantity of the alkali amid.

In testimony whereof I have signed my name to this specification in the presence of two subscribing witnesses.

EDGAR ARTHUR ASHCROFT.

Witnesses:
HARRY B. WIDGE,
PERCY HEWITT.